(12) United States Patent
Yee et al.

(10) Patent No.: US 7,817,977 B1
(45) Date of Patent: Oct. 19, 2010

(54) CONFIGURABLE SIGNAL GENERATOR

(75) Inventors: Dennis Yee, San Francisco, CA (US);
Jacques C. Rudell, San Jose, CA (US);
Hongbing Wu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1078 days.

(21) Appl. No.: 11/140,502

(22) Filed: May 26, 2005

(51) Int. Cl.
*H04B 1/06* (2006.01)
(52) U.S. Cl. .................. 455/260; 455/313; 455/334; 455/209; 375/327; 375/250
(58) Field of Classification Search ........... 455/209, 455/112, 114.2, 260, 313, 317–320, 323, 455/324, 334; 375/250, 290, 327, 346, 350, 375/302, 303, 306, 308
See application file for complete search history.

(56) References Cited

U.S. PATENT DOCUMENTS

| | | | |
|---|---|---|---|
| 6,356,599 B1 * | 3/2002 | Lee | 375/327 |
| 7,098,754 B2 * | 8/2006 | Humphreys et al. | 332/103 |
| 7,177,615 B2 * | 2/2007 | Ono | 455/296 |
| 7,236,541 B1 * | 6/2007 | Bulkoushteyn et al. | 375/295 |
| 2002/0141510 A1 * | 10/2002 | Sridharan et al. | 375/300 |
| 2004/0005869 A1 * | 1/2004 | See et al. | 455/102 |
| 2004/0116096 A1 * | 6/2004 | Shen | 455/323 |

\* cited by examiner

*Primary Examiner*—Nhan Le
(74) *Attorney, Agent, or Firm*—Jiayu Xu

(57) ABSTRACT

A method of generating an output signal comprises receiving an input signal, mixing the input signal with a reference signal having a reference frequency to obtain an intermediate frequency signal having an intermediate frequency, filtering the intermediate frequency signal using a filter having a filter characteristic that is configured according to the intermediate frequency and performing frequency translation on the filtered intermediate frequency signal to obtain the output signal.

21 Claims, 4 Drawing Sheets

CONFIGURABLE SIGNAL GENERATOR

BACKGROUND OF THE INVENTION

In communication systems, signal generators such as transmitters and receivers commonly employ filters to remove noise in the signal path. The systems typically employ static filters that are designed to remove noise in specified frequency ranges. For example, noise in a transmitter may include spurious noise frequencies (also referred to as spurs) resulting from component mismatches and signal leaks, as well as harmonic noise due to mixing the intermediate frequency signal with the reference frequency signal. The noise signal may vary for different signal bands. Therefore, the frequency range that should be filtered is often variable. A static filter is usually unable to eliminate the harmonic noise frequencies that falls within the filter's bandwidth. It would be desirable to have a technique that could reduce variable frequency noise. It would also be desirable if the circuitry could be implemented without significantly increasing the complexity of the existing systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique of generating an output signal is disclosed. In some embodiments, an input signal is mixed with a reference signal to obtain an intermediate frequency signal, which is filtered by a filter with a filter characteristic that is configured according to the intermediate frequency. One example of the configurable filter characteristic includes a bandwidth requirement that may change for different inputs. The filtered signal is frequency translated to obtain the desired output signal. In some embodiments, an input signal and a filtered intermediate frequency signal are compared, and the difference is used by a voltage controlled oscillator to generate an output signal. Frequency translation is performed on the output signal to generate an intermediate frequency signal having an intermediate frequency. The intermediate frequency signal is filtered by a configurable filter to generate the filtered intermediate frequency signal. The configurable filter has a filter characteristic that is configured according to the intermediate frequency signal.

Figure 1:
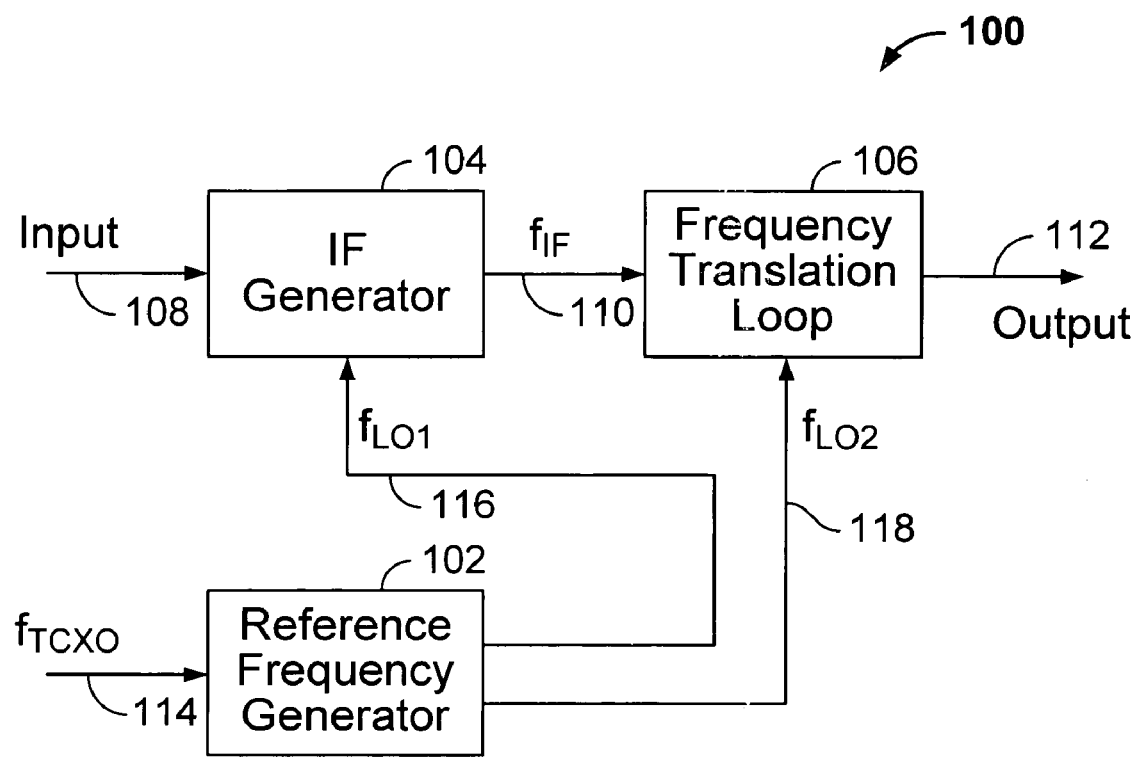
FIG. 1 is a diagram illustrating a signal generator embodiment.

FIG. 1 is a diagram illustrating a signal generator embodiment. In this example, transmitter 100 includes an intermediate frequency (IF) generator 104, a frequency translation loop 106 and a reference frequency generator 102. IF generator 104 receives an input signal 108 and mixes the input signal with a local oscillator frequency signal $f_{LO1}$ 116 to generate an intermediate frequency signal 110 with a center frequency at $f_{IF}$. In the example shown, the input signal is at baseband, thus $f_{IF}$ is approximately equal to $f_{LO1}$. The intermediate frequency signal is sent to a frequency translation loop 106 to be modulated to radio frequency (RF). RF output 112 is generated by frequency translation loop 106.

In the example shown, a reference source such as a temperature controlled crystal oscillator (TCXO) generates a reference frequency signal $f_{TCXO}$ 114. Reference frequency generator 102 uses $f_{TCXO}$ 114 to generate local oscillator frequencies $f_{LO1}$ and $f_{LO2}$, which are required by IF generator 104 and frequency translation loop 106, respectively. Noise signals such as harmonics of $f_{IF}$, $f_{LO1}$, $f_{LO2}$ or combinations thereof may vary for different input frequencies. As will be shown in more details below, IF generator 104 and/or frequency translation loop 106 use filters with configurable filter characteristics to remove variable frequency noise.

Figure 2:
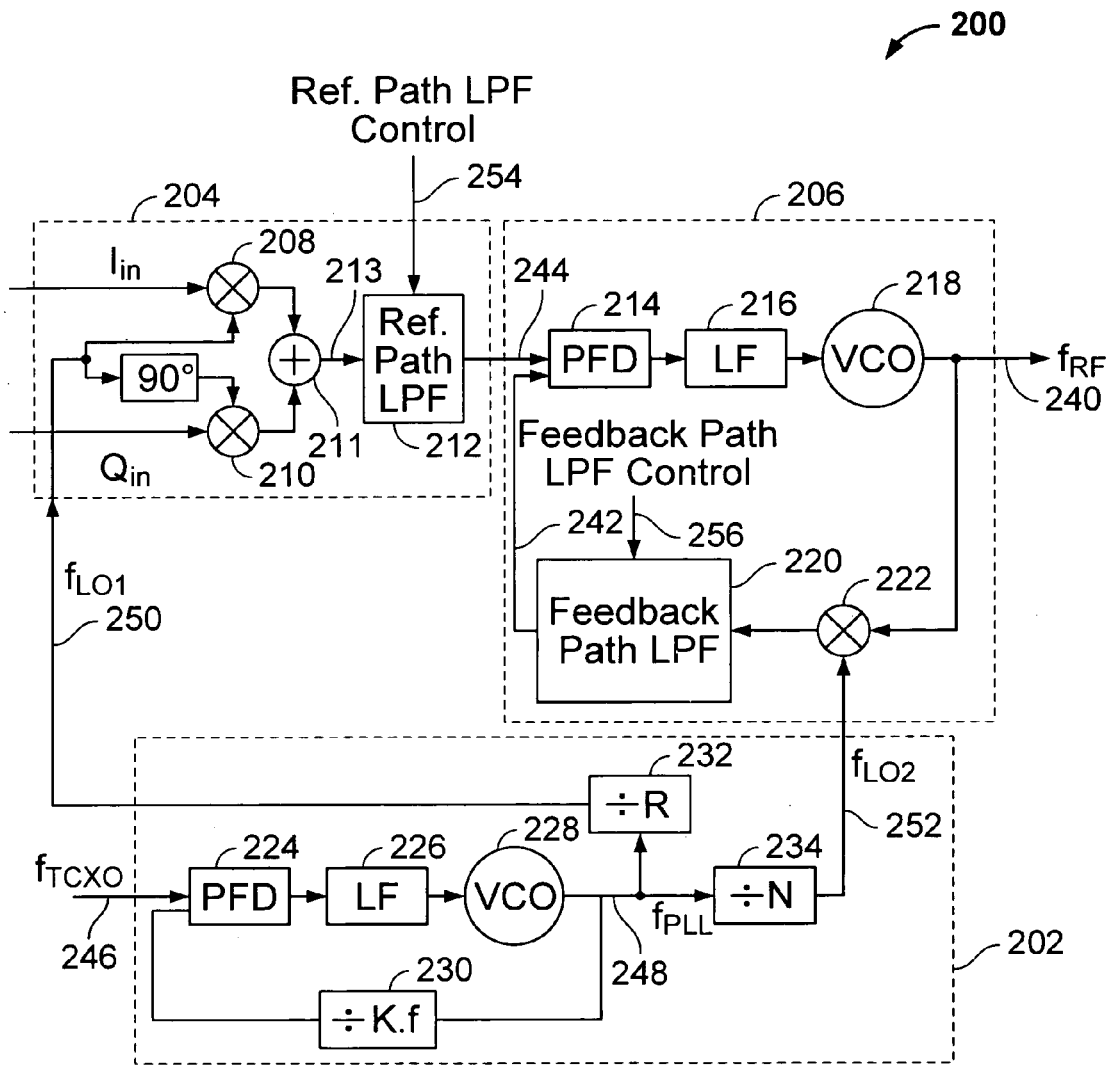
FIG. 2 is a block diagram illustrating a transmitter embodiment.

FIG. 2 is a block diagram illustrating a transmitter embodiment. In this example, transmitter 200 includes an IF generator 204, a frequency translation loop 206 and a reference frequency generator 202. The inphase component ($I_{in}$) and the quadrature component ($Q_{in}$) of the input signal are sent to baseband mixers 208 and 210 respectively. The input components are mixed with a local oscillator frequency $f_{LO1}$ and the mixer outputs are then combined by combiner 211. The path of the input signal via the IF generator is sometimes referred to as the reference path, thus low pass filter (LPF) 212 is referred to as the reference path LPF. Reference path LPF 212 is configured to filter combined signal 213 to generate an IF signal $f_{IF}$ 244.

The filter signal is sent to frequency translation loop 206. The frequency translation loop is so named because during operation, the circuitry translates the loop input into RF. In the example shown, the path of the signal through the frequency translation loop is referred to as the feedback path. Frequency translation loop 206 is formed by a phase-locked loop that includes a phase frequency detector (PFD) 214, a loop filter 216, a voltage controlled oscillator 218, a mixer 222 and a feedback path LPF 220. The output of phase frequency detector 214 is filtered by loop filter 216 and then sent to voltage controlled oscillator 218 to generate an RF output signal 240 with a center frequency $f_{RF}$. The output is fed back to mixer 222, which demodulates the output from RF to IF. The demodulated signal is filtered by feedback path LPF 220 and the filtered signal is sent to PFD 214 for comparison of phase and frequency. Once the phase locked loop enters the locking state, inputs to PFD 214 (i.e. signals 242 and 244) will track each other. In other words, signal 242 will have approximately the same phase and frequency as $f_{IF}$ 244.

Local oscillator frequencies $f_{LO1}$ 250 and $f_{LO2}$ 252 are supplied by reference frequency generator 202. The reference frequency is sent to a fractional PLL, which includes phase frequency detector 224, loop filter 226, voltage controlled oscillator 228 and fractional divider 230. The input of the PLL is reference signal $f_{TCXO}$ 246 and the output of the PLL is $f_{PLL}$ 248. When the PLL is in its locking state, the frequency of the output signal generated by the fractional PLL is equal to the frequency of the reference signal multiplied by the value of fractional-divider 230. For example, if $f_{TCXO}$ has a frequency of 26 MHz and the fractional divider has a fractional value (K.f) of 153.8, then the frequency of $f_{PLL}$ is approximately 4 GHz. The PLL output is then frequency divided by dividers 232 and 234 to generate mixer local oscillator signals $f_{LO1}$ 250 and $f_{LO2}$ 252 respectively. Divider 232 has a value of R and divider 234 has a value of N. In the example shown, R and N are integers. Fractional R and N values are also possible in some embodiments.

Sometimes it is useful to vary the frequency of $f_{IF}$ during transmission to avoid spurs that are substantially close to the mixer local oscillator signal $f_{LO2}$ and may degrade output signal (such spurs are sometimes referred to as close-in spurs). The close-in spurs typically arise due to imperfections in the reference frequency generator 202. Examples of such imperfections include the coupling of other signals (such as harmonics of the $f_{TCXO}$) into the PLL and charge-pump current mismatch in the PFD. For a fractional PLL, the spurs tend to have frequency of N×$f_{TCXO}$, where N is an integer. Spurs may also appear at 0.5×N×$f_{TCXO}$, 0.25×N×$f_{TCXO}$ or 0.125× N×$f_{TCXO}$, etc. In general, for a fractional PLL, spurs may appear at $(½^M)$×N×$f_{TCXO}$, where M and N are positive integers.

Strong close-in spurs are problematic since they will mix with the signal at $f_{RF}$, resulting in undesired signal components. The undesired signal components are added to the desired output. The addition will degrade the quality of the output signal since feedback path LPF 256 cannot separate the undesired and the desired components. The spurs closer in frequency to the desired signal and the spurs corresponding to smaller values of M are typically stronger. For example, consider a fractional PLL with $f_{TCXO}$ of 26 MHz and output frequency $f_{PLL}$=3534 MHz=135.9230769×26 MHz. For M=0, 1 and 2, spurs may appear at 135×26=3510 MHz, 135.25×26=3516.5 MHz, 135.5×26=3523 MHz, 135.75×26=3529.5 MHz, and 136×26=3536 MHz. Because of frequency division, spurs substantially close to $f_{PLL}$ will result in close-in spurs of $f_{LO2}$ and cause distortion. In this case, the spur appearing at 3536 MHz will introduce the most distortion since it is only 2 MHz away from the desired $f_{PLL}$ frequency of 3534 MHz. The presence of the spur in the output of the PLL leads to a close-in spur in the reference signal generated. Other potential spurs further away from 3534 MHz are less problematic since they tend to be weaker.

In the embodiment shown, IF generator 204 is configurable, allowing $f_{IF}$ to shift when the spurs degrade output quality. During operation, if any strong close-in spur is present, the IF generator is reconfigured to generate a different $f_{IF}$. Changing $f_{IF}$ changes the PLL output frequency $f_{PLL}$ and results in a different spur profile. When an appropriate $f_{IF}$ is chosen, the resulting spurs move further away from $f_{IF}$ and can be more easily filtered. In some embodiments, the $f_{IF}$ is chosen with the additional constraint of also moving harmonic frequencies away from $f_{PLL}$ and $f_{LO2}$. Reference path LPF 212 and feedback path LPF 220 are configurable in the embodiment shown. The parameters of one or both of the LPFs are configured according to $f_{IF}$ to better remove the noise.

Control signals 254 and 256 are used to adjust the parameters of reference path LPF 212 and feedback path LPF 220 respectively to achieve appropriate filter characteristics. In some embodiments, the control signals are derived from the values of N and R. The frequency relationship of the signals associated with the frequency translation loop PLL is expressed as:

$$f_{LO2}-f_{IF}=f_{RF} \qquad \text{(equation 1),}$$

where $$f_{LO2}=f_{PLL}/N \qquad \text{(equation 2), and}$$

$$f_{IF}=f_{LO1}=f_{PLL}/R \qquad \text{(equation 3).}$$

Given a specific output frequency, an appropriate $f_{IF}$ can be selected to avoid strong close-in spurs. Consider again the numerical example given above. The desired RF frequency is 824.6 MHz. One way to generate the desired $f_{RF}$ is to choose $f_{IF}$=58.9 MHz and $f_{LO2}$=883.5 MHz. In this case, N=4, R=60, and $f_{PLL}$=3534 MHz. Based on equation 1, $f_{RF}=f_{LO2}-f_{IF}$, or 824.6=3534/4−3534/60=883.5−58.9.

As shown above, there is a potentially strong spur that is 2 MHz away from the desired PLL frequency of 3534 MHz. This spur translates to a close-in spur of 884 MHz. One way to avoid this spur is to choose a new $f_{IF}$=63.43076923 MHz and $f_{LO2}$=888.0307692 MHz. For this case, N=4, R=56, and $f_{PLL}$=3552.123077 MHz=136.6201183×26 MHz. Considering M=0, 1 and 2, spurs may appear at 136×26=2536 MHz, 136.25×26=3542.5 MHz, 136.5×26=3549 MHz, 136.75×26=3555.5 MHz, and 137×26=3562 MHz. In this case, the closest spur to is weaker since it is both further away (3.123 MHz vs 2 MHz)), and the value of M is larger (M=1 vs. M=0).

In some embodiments, R is substantially greater than N. In an example with a 4 GHz $f_{PLL}$, N is 4 and R is approximately 50. For configuration purposes, $f_{RF}$, $f_{PLL}$ and N are chosen to be fixed values while the value for R is adjusted to obtain the desired $f_{IF}$. The filter characteristics are adjusted according to $f_{IF}$. In some embodiments, the bandwidth of the LPF is configured such that $f_{IF}$ falls substantially within the bandwidth while the harmonic noise frequencies are located substantially outside the bandwidth. Details of the tuning process are discussed in U.S. patent application Ser. No. 10/854,027 filed May 25, 2004, entitled DIGITAL NOISE COUPLING REDUCTION AND VARIABLE INTERMEDIATE FREQUENCY GENERATION IN MIXED SIGNAL CIRCUITS, which is incorporated herein by reference for all purposes.

Figure 3A:
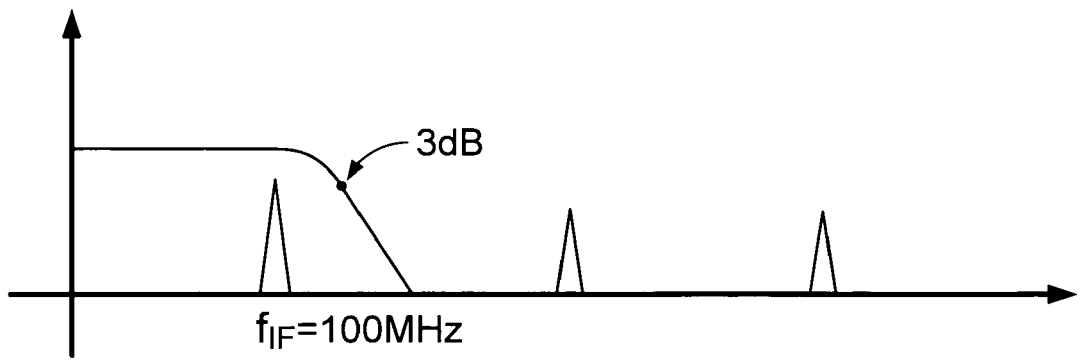
FIGS. 3A-3C are diagrams illustrating changing filter characteristics for different $f_{IF}$, according to some embodiments.
Figure 3B:
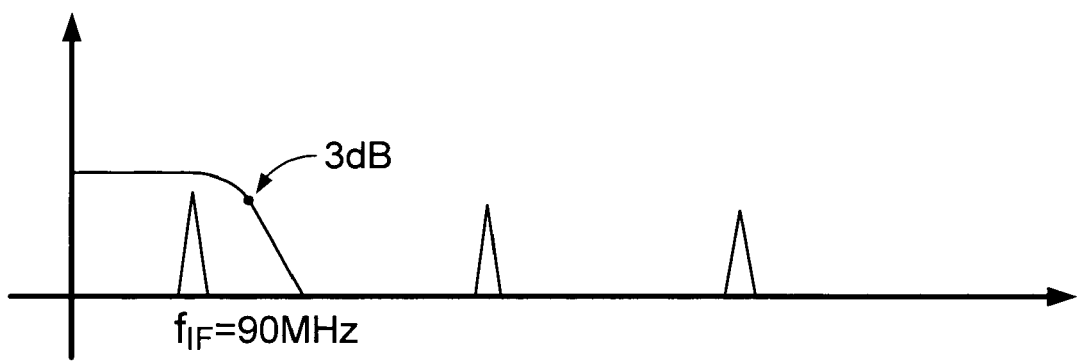
Figure 3C:
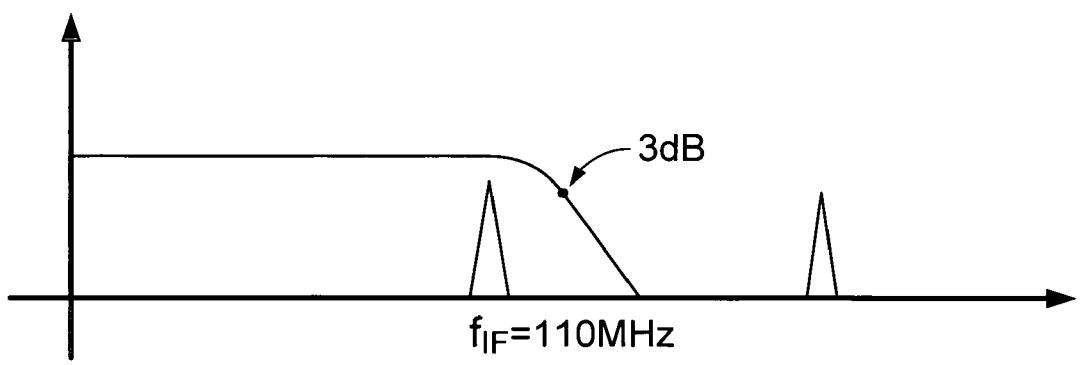

FIGS. 3A-3C are diagrams illustrating changing filter characteristics for different $f_{IF}$, according to some embodiments. In the example shown, the 3 dB roll off point of the low pass filter's transfer function is set to be 10% greater than $f_{IF}$. Other values may be used in different embodiments. As $f_{IF}$ changes, the bandwidth of the filter also changes to ensure that frequency of interest, $f_{IF}$, is preserved in the filter output and the noise harmonics associated with $f_{IF}$ are removed.

Figure 4A:
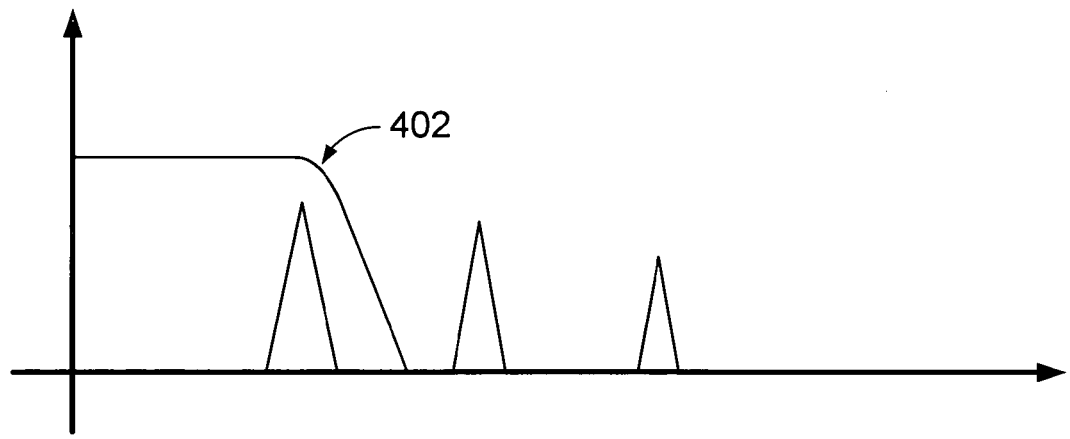
FIGS. 4A-4B illustrate the difference in transfer function between a reference path low pass filter and a feedback path low pass filter according to one embodiment.
Figure 4B:
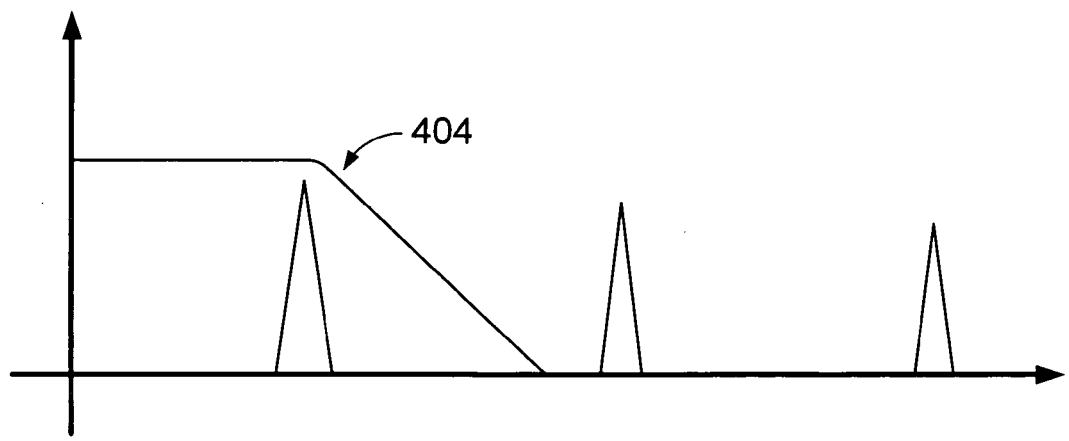

In some embodiments, the harmonic noise to be filtered by feedback path low pass filter 220 are spaced further apart than the harmonic noise to be filtered by reference path low pass filter 212. The requirements of feedback path LPF 220 can be relaxed consequently so that the feedback path LPF can be implemented more efficiently. FIGS. 4A-4B illustrate the difference in transfer function between a reference path low pass filter and a feedback path low pass filter according to one embodiment. The harmonics of $f_{IF}$ are spaced relatively close, thus filter transfer function 402 of the reference path LPF is required to have a relatively steep roll off in order to reject the harmonic frequencies. In contrast, in the feedback path, the harmonics of $f_{LO2}$ are spaced further apart, hence filter transfer function 404 of the feedback path LPF has a roll off that is more gradual. The difference in the filter transfer functions indicate that the feedback path LPF can be implemented as a lower order filter than the reference path LPF. The resulting feedback path LPF has smaller circuit area and consumes less power than the reference path LPF, achieving over all cost and power savings.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating an output signal, comprising:
   receiving an input signal;
   mixing the input signal with a reference signal having a reference frequency to obtain a first intermediate frequency signal having a first intermediate frequency that is variable in response to detecting an undesirable noise signal in the output signal;
   filtering the first intermediate frequency using a reference path filter having a filter characteristic that is configured according to the intermediate frequency of the intermediate frequency signal; and
   performing frequency translation on the filtered intermediate frequency signal to obtain the output signal, comprising:
      comparing the filtered first intermediate frequency signal with a feedback signal to generate a difference signal;
      applying the difference signal to a voltage controlled oscillator to generate the output signal;
      performing frequency translation on the output signal to generate a second intermediate frequency signal having a center frequency that is approximately the first intermediate frequency; and
      filtering the second intermediate frequency signal via a feedback path filter to generate the feedback signal,
      wherein the feedback path filter has a filter characteristic that is configured according to the first intermediate frequency.

2. The method as recited in claim 1, wherein the filter characteristic is configured to meet a filter bandwidth requirement.

3. The method as recited in claim 1, wherein the filter characteristic is configured to meet a filter bandwidth requirement requiring the first intermediate frequency to be substantially within the bandwidth of the filter, and a noise frequency to be substantially outside the bandwidth of the filter.

4. The method as recited in claim 1, wherein the reference signal is generated by a fractional phase locked loop (PLL).

5. The method as recited in claim 1, wherein the reference signal is generated by dividing a fractional phase locked loop (PLL) by an integer R.

6. The method as recited in claim 1, further comprising adjusting the reference frequency to generate an adjusted intermediate frequency signal having an adjusted intermediate frequency and reconfiguring the filter characteristic according to the adjusted intermediate frequency.

7. The method as recited in claim 1, wherein performing frequency translation includes down converting the filtered first intermediate frequency signal via a frequency translation loop.

8. The method as recited in claim 1, wherein the feedback path filter is a lower order filter than the reference path filter.

9. A signal generator comprising:
   an input interface configured to receive an input signal;
   a mixer, coupled to the input interface, configured to modulate the input signal with a reference frequency signal having a reference frequency to obtain a first intermediate frequency signal having a first intermediate frequency that is variable in response to detecting an undesirable noise signal in an output signal;
   a configurable filter, coupled to the mixer, configured to filter the first intermediate frequency signal to obtain the output signal,
   wherein the configurable filter has a filter characteristic that is configurable according to the intermediate frequency of the intermediate frequency signal; and
   a frequency translation loop, coupled to the filtered first intermediate frequency signal, the frequency translation loop comprising:
      a phase frequency detector configured to compare the filtered first intermediate frequency signal with a feedback signal to generate a difference signal;
      a voltage controlled oscillator configured to apply a local oscillator signal to the difference signal to generate a second output signal;
      a mixer configured to demodulate the second output signal from RF to generate a second intermediate frequency signal having a center frequency that is approximately the first intermediate frequency; and
      a feedback path filter configured to filter the second intermediate frequency signal to generate the feedback signal,
      wherein the feedback path filter has a filter characteristic that is configured according to the first intermediate frequency.

10. The signal generator as recited in claim 9, wherein the filter characteristic is configurable to have a bandwidth that meets a bandwidth requirement determined according to the intermediate frequency signal.

11. The signal generator as recited in claim 9, wherein the filter characteristic is configured to meet a filter bandwidth requirement requiring the intermediate frequency to be substantially within the bandwidth of the filter, and a noise frequency to be substantially outside the bandwidth of the filter.

12. The signal generator as recited in claim 9, further comprising a fractional phase locked loop configured to generate the reference signal.

13. A signal generator comprising:
   means for receiving an input signal;
   means for mixing the input signal with a reference signal having a reference frequency to obtain an intermediate frequency signal having an intermediate frequency that is variable in response to detecting an undesirable noise signal in the output signal;
   means for filtering the intermediate frequency signal using a filter having a filter characteristic that is configured according to the intermediate frequency of the intermediate frequency signal; and
   means for performing frequency translation on the filtered intermediate frequency signal to obtain the output signal, wherein said means for performing frequency translation further comprises:

means for comparing the filtered first intermediate frequency signal with a feedback signal to generate a difference signal;

means for applying the difference signal to a voltage controlled oscillator to generate the output signal;

means for performing frequency translation on the output signal to generate a second intermediate frequency signal having a center frequency that is approximately the first intermediate frequency; and means for filtering the second intermediate frequency signal via a feedback path filter to generate the feedback signal, wherein the feedback path filter has a filter characteristic that is configured according to the first intermediate frequency.

14. The signal generator as recited in claim 13, wherein the filter characteristic is configured to meet a filter bandwidth requirement requiring the first intermediate frequency to be substantially within the bandwidth of the filter, and a noise frequency to be substantially outside the bandwidth of the filter.

15. The signal generator as recited in claim 13, further comprising means for adjusting the reference frequency to generate an adjusted intermediate frequency signal having an adjusted intermediate frequency and means for reconfiguring the filter characteristic according to the adjusted intermediate frequency.

16. The signal generator as recited in claim 13, wherein performing frequency translation includes down converting the filtered first intermediate frequency signal via a frequency translation loop.

17. A computer readable medium having stored thereon processor-executable software instructions configured to cause a wireless communication device processor to perform steps comprising:

receiving an input signal;

mixing the input signal with a reference signal having a reference frequency to obtain a first intermediate frequency signal having a first intermediate frequency that is variable in response to detecting an undesirable noise signal in the output signal;

filtering the first intermediate frequency using a reference path filter having a filter characteristic that is configured according to the intermediate frequency of the intermediate frequency signal; and performing frequency translation on the filtered intermediate frequency signal to obtain the output signal, comprising:

comparing the filtered first intermediate frequency signal with a feedback signal to generate a difference signal;

applying the difference signal to a voltage controlled oscillator to generate the output signal;

performing frequency translation on the output signal to generate a second intermediate frequency signal having a center frequency that is approximately the first intermediate frequency; and filtering the second intermediate frequency signal via a feedback path filter to generate the feedback signal, wherein the feedback path filter has a filter characteristic that is configured according to the first intermediate frequency.

18. The computer readable medium of claim 17, wherein the filter characteristic is configured to meet a filter bandwidth requirement.

19. The computer readable medium of claim 17, wherein the filter characteristic is configured to meet a filter bandwidth requirement requiring the first intermediate frequency to be substantially within the bandwidth of the filter, and a noise frequency to be substantially outside the bandwidth of the filter.

20. The computer readable medium of claim 17, wherein the computer readable medium has processor-executable software instructions configured to cause the wireless communication device processor to perform further steps comprising:

adjusting the reference frequency to generate an adjusted intermediate frequency signal having an adjusted intermediate frequency; and reconfiguring the filter characteristic according to the adjusted intermediate frequency.

21. The computer readable medium of claim 17, wherein the computer readable medium has processor-executable software instructions configured to cause the wireless communication device processor to perform further steps comprising:

down converting the filtered first intermediate frequency signal via a frequency translation loop.

* * * * *